Aug. 15, 1961 H. C. LEHDE 2,996,162
DEVICES FOR EXCLUDING MAGNETIC PARTICLES FROM SEALS AND BEARINGS
Filed April 7, 1958 5 Sheets-Sheet 1
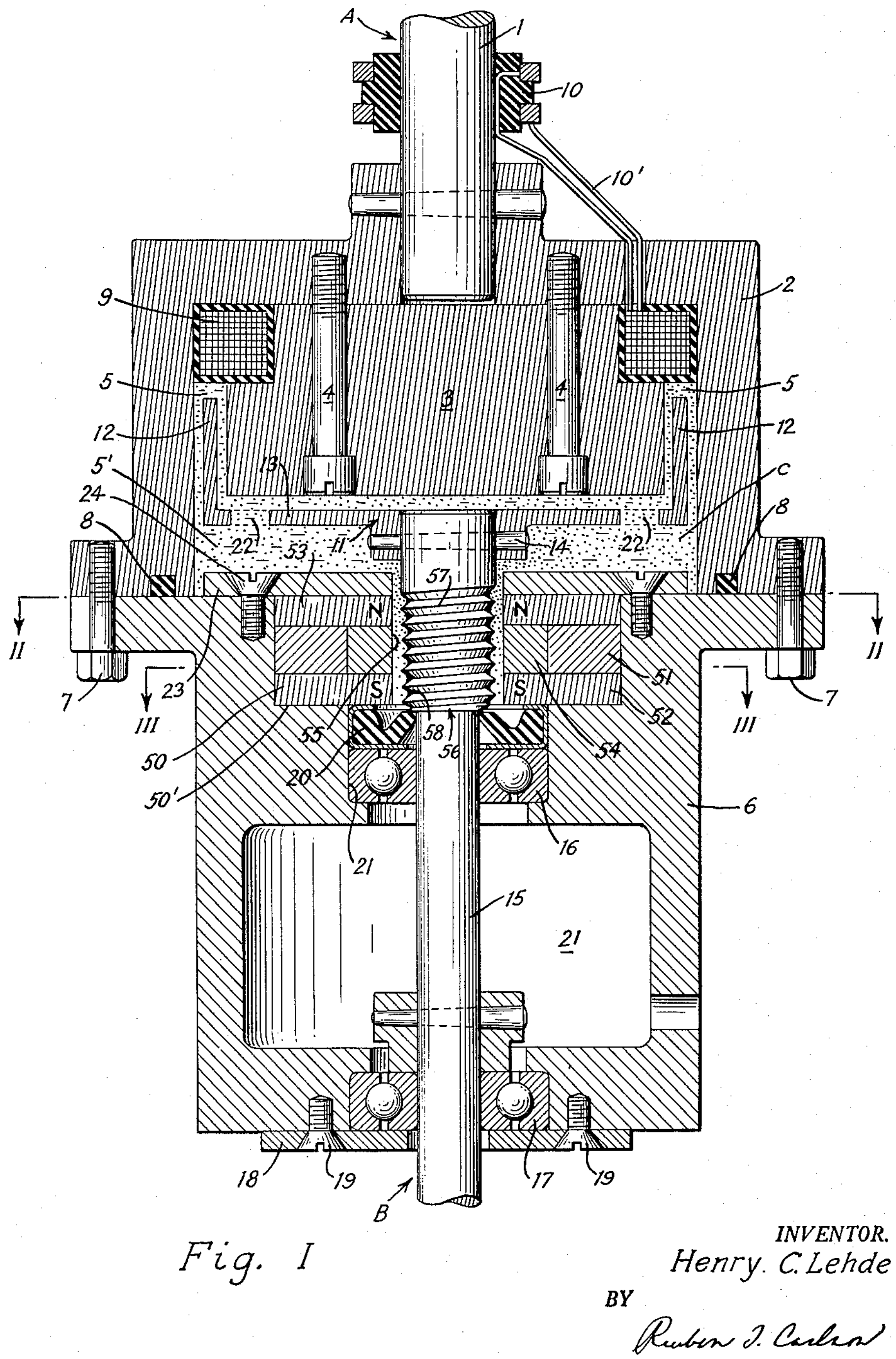
Fig. I
INVENTOR.
Henry. C. Lehde
BY
Ruben J. Carlson
ATTORNEY

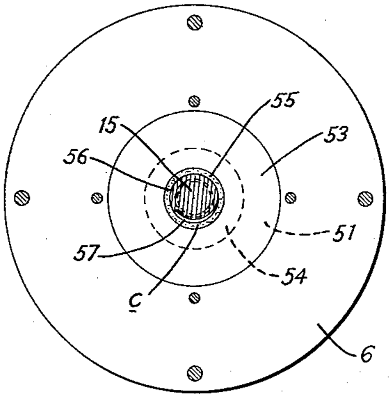
Fig. II
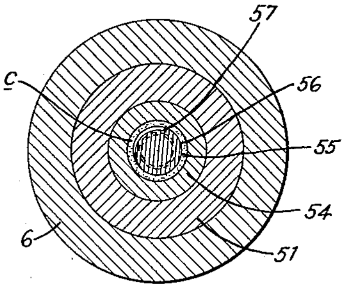
Fig. III
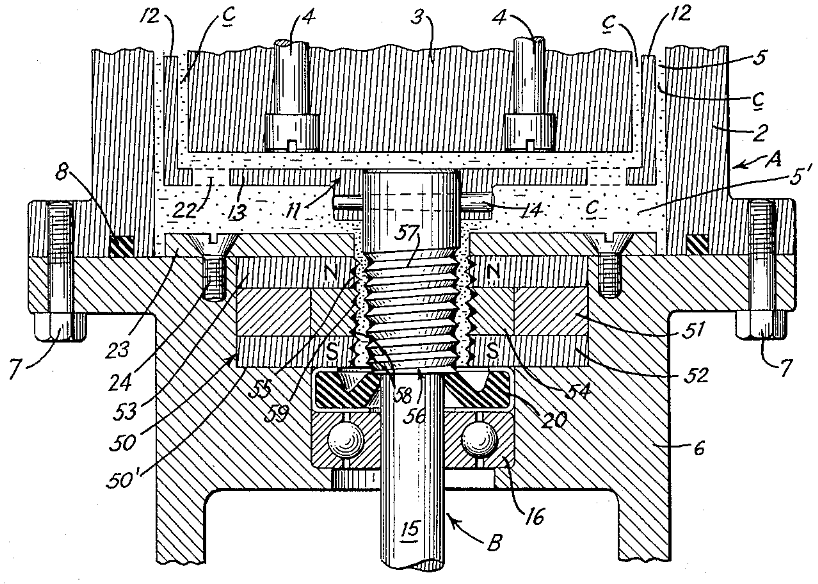
Fig. IV
INVENTOR.
Henry C. Lehde
BY
Reuben I. Carlson
ATTORNEY Aug. 15, 1961 H. C. LEHDE 2,996,162
DEVICES FOR EXCLUDING MAGNETIC PARTICLES FROM SEALS AND BEARINGS
Filed April 7, 1958 5 Sheets-Sheet 3
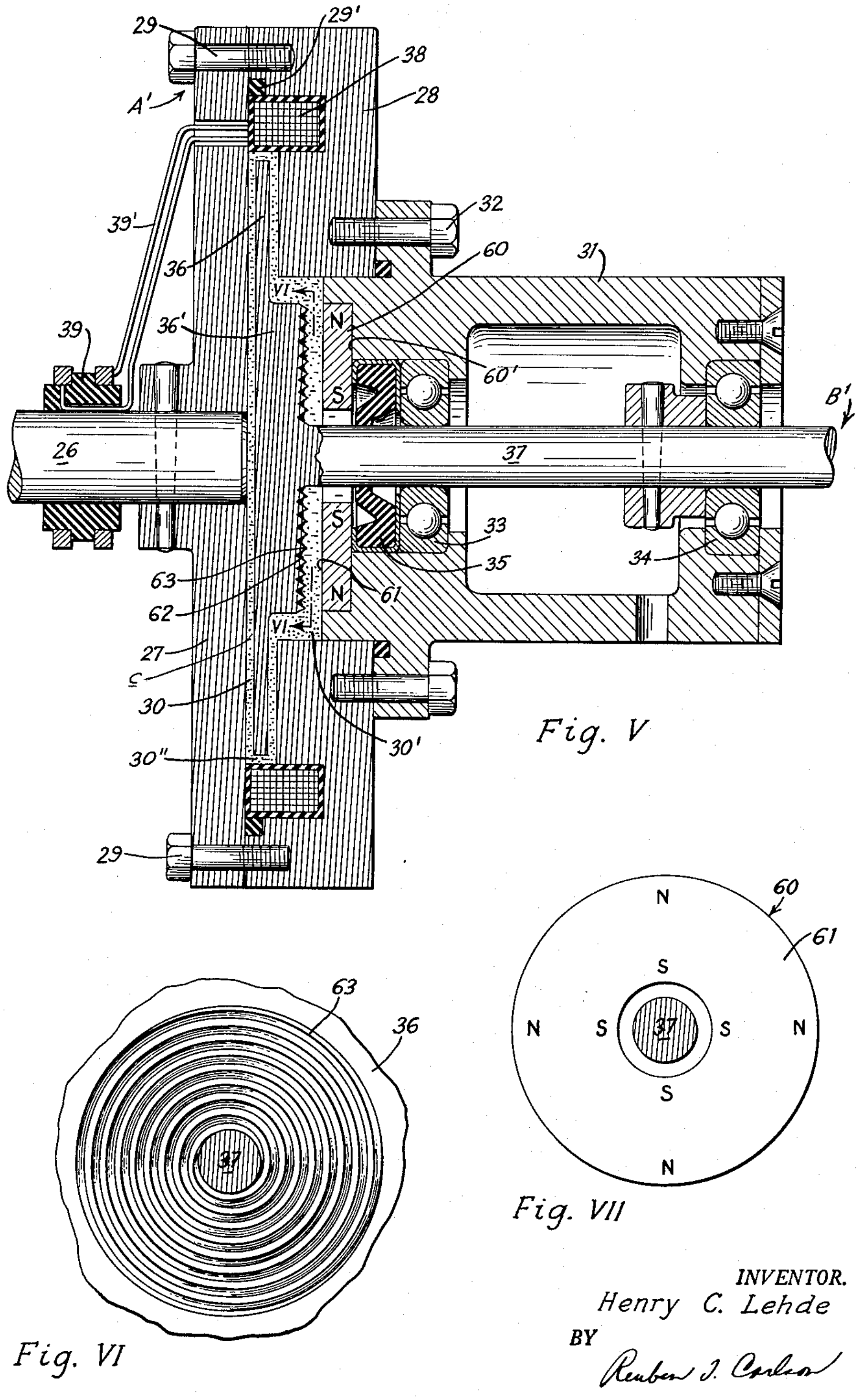
Fig. V Fig. VI Fig. VII
INVENTOR.
Henry C. Lehde
BY
Reuben J. Carlson
ATTORNEY DEVICES FOR EXCLUDING MAGNETIC PARTICLES FROM SEALS AND BEARINGS
Filed April 7, 1958 5 Sheets-Sheet 4
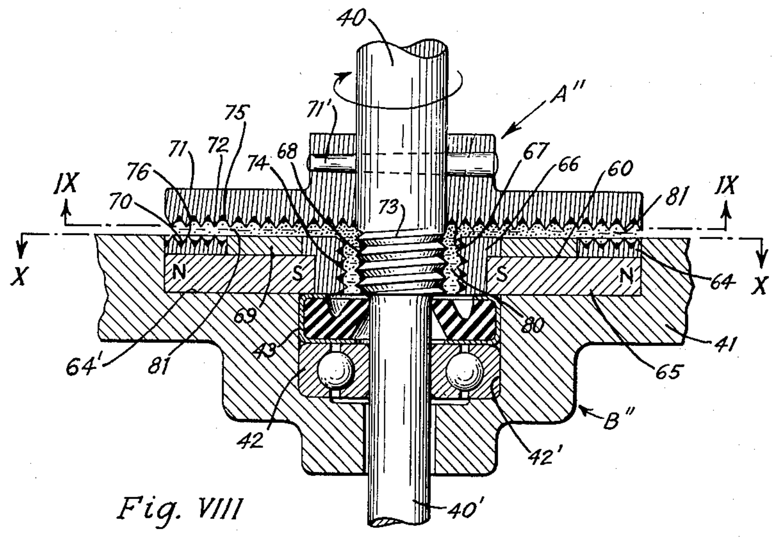
Fig. VIII
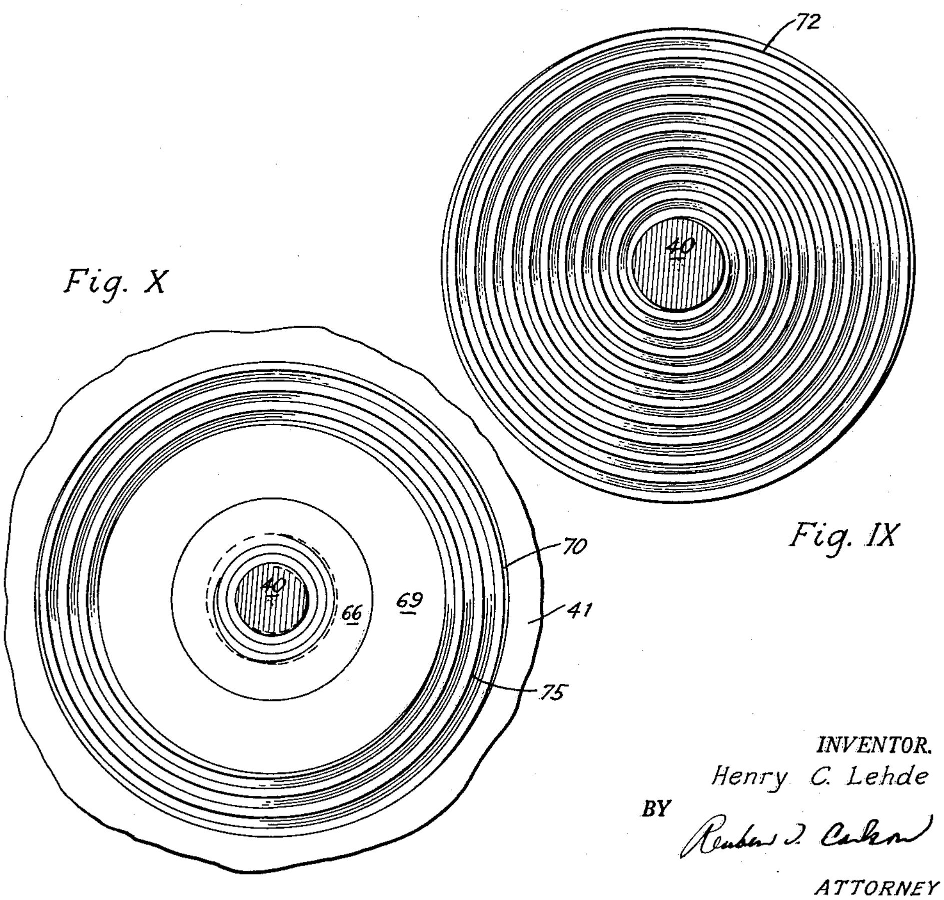
Fig. X, Fig. IX
INVENTOR.
Henry C. Lehde
BY
Reuben J. Carlson
ATTORNEY DEVICES FOR EXCLUDING MAGNETIC PARTICLES FROM SEALS AND BEARINGS
Filed April 7, 1958 5 Sheets-Sheet 5
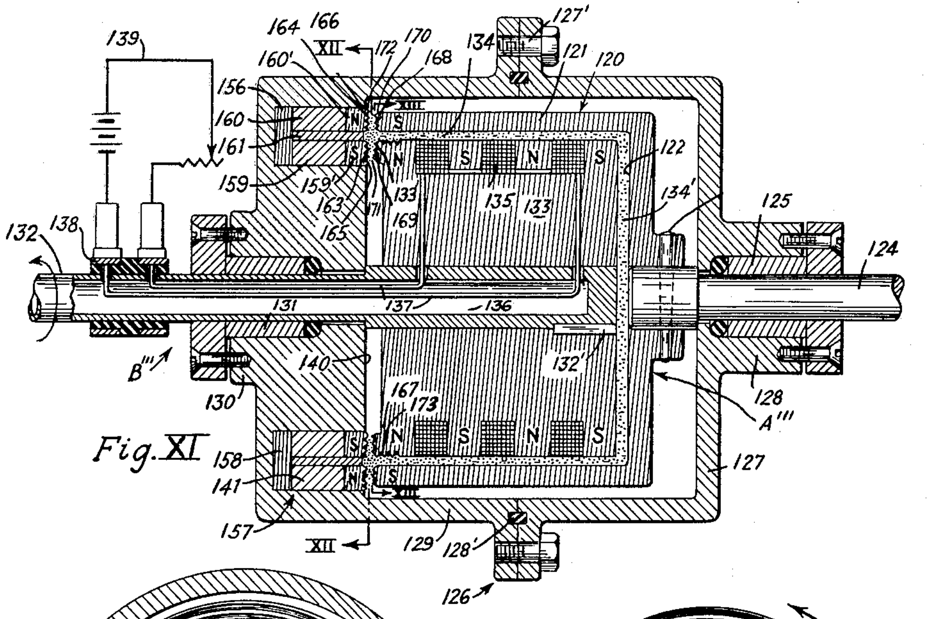
Fig. XI
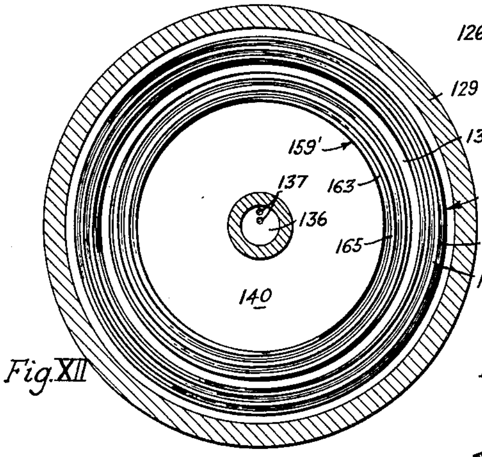
Fig. XII
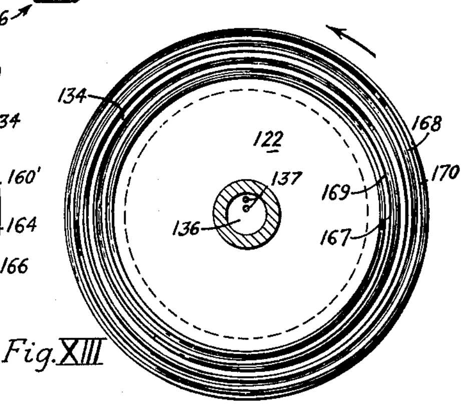
Fig. XIII
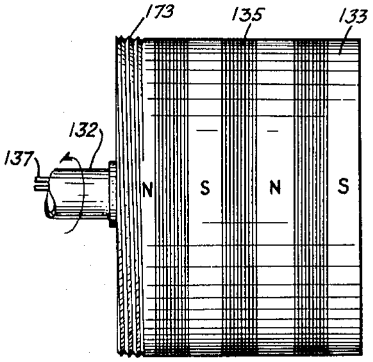
Fig. XIV
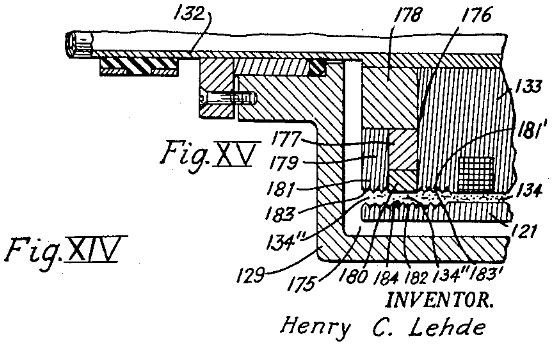
Fig. XV
INVENTOR.
Henry C. Lehde
BY
Ruben J. Carlson
ATTORNEY

United States Patent Office 2,996,162

Patented Aug. 15, 1961

2,996,162

DEVICES FOR EXCLUDING MAGNETIC PARTICLES FROM SEALS AND BEARINGS

Henry C. Lehde, Northport, N.Y.
(377 Park Ave., Paterson, N.J.)

Filed Apr. 7, 1958, Ser. No. 726,807
14 Claims. (Cl. 192—21.5)

This invention relates to devices for excluding magnetic particles from seals and bearings, and more particularly to a device designed to positively exclude magnetic particles from the seals or bearings between two relatively rotatable parts or mechanisms. This invention is ideally suited for use in association with magnetic coupling mechanisms such as magnetic fluid or magnetic powder clutches and brakes, as well as other mechanisms whose seals and bearings are exposed to the entry of magnetic particles.

A major problem in the use of magnetic couplings such as clutches and brakes, results from the entry of the magnetic particles, used to provide the clutching or braking medium, into the shaft seals and bearings which are thereby seriously damaged and eventually destroyed by the abrading action of the magnetic particles. To meet this problem, intricate labyrinth seals or bulky diaphragm sealing arrangements, have heretofore been used with unsatisfactory results.

A combination of particle filters and oil pressure pumps for continuously filtering the magnetic particles from the magnetic particle-oil mixture, and the pressure circulation of the filtered lubricant around the bearings, has also been used with unsatisfactory results. Magnetic fluid mixtures normally contain a solid or pasty lubricating component, in addition to the liquid lubricating component, which soon clogs the filter and renders it inoperative. This filtering procedure obviously cannot be used for protecting seals and bearings where the magnetic mixture is relatively dry or pasty in character.

For these reasons, the otherwise advantageous use of magnetic fluid or powder clutches, brakes and other coupling mechanisms, whose seals and bearings are exposed to the entry of magnetic particles, has been seriously restricted.

It is an object of this invention to provide a simple, compact and reliable device for protecting oil seals and bearings from contact with magnetic particles employed in the operation of magnetic clutches, brakes and other coupling mechanisms.

Another object of this invention is to provide a device for excluding magnetic particles from seals and bearings, which can be simply and advantageously incorporated into the bearing housing adjacent the bearing assembly, which is automatic and foolproof in operation, and which will give a lifetime of service without maintenance or attention.

Another object of this invention is to provide a device for excluding magnetic particles from seals and bearings, which can be advantageously built into any type of coupling mechanism, and which is substantially free of frictional and magnetic drag.

A further object of this invention is to provide a device for excluding magnetic particles from seals and bearings, which is made of relatively few parts, is inexpensive to manufacture, is rugged and durable in use and which may be readily incorporated and installed into any type of coupling mechanism either adjacent to or removed from the bearing assembly.

A further object of this invention is to provide a device for excluding magnetic particles from the seals and bearings of coupling mechanisms having two relatively rotatable parts, and which device incorporates magnetic pole surfaces, positioned in coaxial relation to the seal or bearing to be protected, and which operates to positively and continuously move all magnetic particles away from the seal or bearing during relative rotation of the two parts of the coupling mechanism.

Other objects and advantages of this invention will become apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which:

FIG. I is a longitudinal section of a typical drag-cup type of magnetic coupling mechanism having incorporated therein the device of this invention which is designed to exclude magnetic particles used as the clutching medium from the shaft seal and bearings of the clutch mechanism;

FIG. II is a tranverse section of the coupling mechanism as the same would appear when viewed along the line II—II of FIG. I, this view showing the helical thread or rib formed on the magnetizable surface of the bearing supported shaft and which cooperates with the adjacent interior surface of a toroidal magnet assembly supported within the bearing housing to positively eject magnetic particles which migrate therebetween;

FIG. III is another transverse section of the coupling mechanism as the same would appear when viewed along line III—III of FIG. I, this view showing a transverse section of the non-magnetic bearing housing, the magnet ring and non-magnetic spacer core of the magnet assembly, and the bearing supported shaft whose exterior magnetizable surface carries the helical rib;

FIG. IV is a fragmentary longitudinal section of the coupling mechanism shown in FIG. I having a modified form of magnetic particle excluding device incorporated therein, and wherein the interior cylindrical surface of the toroidal magnet assembly also presents a helical thread or rib adjacent to but of opposite hand turn from the helical rib on the adjacent magnetizable section of the bearing supported shaft;

FIG. V is a longitudinal section of a disc type magnetic coupling mechanism having incorporated therewith a further modified form of magnetic particle excluding device which includes a spiraling particle exclusion thread or rib suitably attached to or formed on the coupling disc and in adjacent cooperating relation to the radial face of a toroidal magnet assembly;

FIG. VI is a transverse section of the coupling mechanism of FIG. V as the same would appear when viewed along line VI—VI of FIG. V and showing the spiraling particle exclusion rib formed on the magnetizable surface of the coupling disc;

FIG. VII is a transverse section showing the radial face of the toroidal magnet assembly of FIG. V which is positioned adjacent to and cooperates with the adjacent spiraling rib on the magnetizable surface of the coupling disc, and a cross section of the bearing supported shaft which is fixed to the coupling disc;

FIG. VIII is a fragmentary longitudinal section taken through a mechanism having two relatively rotatable parts, one of which may be either stationary or differentially rotated with respect to the other; and having a further modified form of magnetic particle excluding device associated therewith which includes a pair of cooperating right and left hand helical threads associated with the magnetizable sections of the bearing supported shaft and the adjacent interior surface of the toroidal magnet assembly, together with cooperating spiraling ribs associated with the radial surface of the magnet assembly fixed to one of the parts and a companion radial surface fixed to the other part;

FIG. IX is a transverse section of the magnetic particle exclusion device of FIG. VIII as the same would appear when viewed in the direction of the arrows IX—IX of FIG. VIII, this view showing a cross section of the bearing supported shaft and the radial surface of the magnet assembly having a spiraling thread or rib thereon;

FIG. X is a transverse section of the mechanism shown in FIG. VIII as the same would appear when viewed in the direction of the arrows X—X thereof, this view showing a cross section of the helical rib section of the shaft, the interior helical rib section of the toroidal magnet assembly, and the radial surface of the toroidal magnet assembly which has the spiraling rib or thread formed thereon and which is directly adjacent to the spiraling rib surface carried by a disc-shaped member of the device;

FIG. XI is a longitudinal section of another form of magnetic coupling mechanism whose relatively rotatable parts are enclosed within a stationary casing and which incorporates another form of the device of this invention for retaining the magnetic coupling medium in the vicinity of the effective coupling area;

FIG. XII is a transverse section of the coupling mechanism of FIG. XI as the same would appear when viewed along line XII—XII of FIG. XI, this view showing a transverse section of the outer stationary casing, a transverse section of the driving shaft, and a face view of the toroidal magnet assembly having spiral ribs which operate to return migrating particles to the vicinity of the effective coupling area;

FIG. XIII is a transverse section of the coupling mechanism as the same would appear when viewed along lines XIII—XIII of FIG. XI, this view showing the adjacent end faces of the relatively rotatable coupling members, each having a spiraling rib which cooperates with the adjacent spiraling rib of the toroidal magnet assembly to return migrating magnetic particles to the vicinity of the effective coupling area;

FIG. XIV is a face view of one of the coupling members which supports a series of spaced electromagnetic coils which generate the magnetic field in the coupling gap defined between the coupling members of the mechanism; and FIG. XV is a fragmentary sectional view of the magnetic coupling mechanism shown in FIG. IV having a modified device incorporated therein which is operative to return migrating magnetic particles to the vicinity of the effective coupling area.

Similar reference characters refer to similar parts throughout the several views of the drawings and specification.

Devices for excluding magnetic particles from bearing assemblies may be variously shaped and formed in accordance with this invention for association with two relatively rotatable parts of various types and kinds of mechanisms. Magnetic particle exclusion devices of this invention may, by way of example, be associated with two relatively rotatable parts wherein one part remains relatively stationary with respect to the other rotatable part. The magnetic particle exclusion devices of this invention are also admirably adapted for association with the two relatively rotatable parts of the clutch, brake or other coupling mechanisms, and whose driving part is coupled with a driven part by flowable magnetic particles in a manner to establish a desired amount of slippage therebetween when the flowable magnetic particles are magnetized, during at least some period of rotation of the parts. The term "flowable magnetic particles" as used in this specification is intended to include all magnetic coupling materials and mixtures, such as iron powder and mixtures of iron powder and oil, which may also contain a solid lubricant such as graphite and molybdenum disulphide.

It will also be understood that the term "relatively rotatable" members and parts as used in this specification is intended to mean two members or parts which will have a degree of differential rotation during at least some period of operation, and which may vary from the differential rotation typified between a stationary part and a rotating part, to a differential rotation typified by two rotating parts having only a small degree of rotary slippage therebetween during some interval of rotation, as in the case of magnetic clutch or brake mechanisms.

Magnetic particle exclusion devices constructed in accordance with this invention are particularly designed to employ forces engendered by relative rotation between two parts of a mechanism to forcibly eject flowable magnetic particles which migrate towards the bearing assembly from contact therewith. This unique device employs a magnet assembly which incorporates a permanent magnet or an electromagnet to create an intense magnetic field between two adjacent magnetizable surfaces which are fixed to the respective relatively rotatable parts. The operating principles of this device further include the provision of an inclined thread or raised line, hereafter more generally termed a rib, on either one or both of the adjacent relatively rotatable surfaces which establish lines of greatest magnetic intensity at the apices of the inclined ribs. As a result, migrating magnetic particles contained in the magnetic fluid or magnetic powder are strongly attracted to the apices of the ribs. Since the ribs are inclined away from the seal or bearing the magnetic particles clinging to the apices thereof are positively transported in a direction away from the seal or bearing and prevented from entry into the seal or bearing during relative rotation of the two parts of the mechanism.

Where the two magnetizable surfaces of this magnetic particle exclusion device take the form of adjacent exterior and interior cylindrical surfaces, the inclined rib can be advantageously made in the form of a helix on either the exterior or the interior surface, or on both surfaces. Where only one of the surfaces carries the helical rib, the rib is so inclined that relative rotation of the surfaces will move the abrasive particles clinging to the rib in a direction away from the seal or bearing. Where both of the magnetizable surfaces of the excluding device are provided with adjacent helical ribs, one rib would have a right and the other a left hand turn, and so arranged as to maintain magnetic lines of maximum magnetic intensity between the adjacent helical ribs whose respective turns are so directed as to jointly cooperate in positively moving the magnetic particles between them in a direction away from the bearing assembly.

Where the mechanism with which this exclusion device is to be associated is so constructed as to favor the use of two radial extending magnetic particle excluding surfaces which define an axial gap therebetween, either one or both surfaces are provided with adjacent spiraling ribs which spiral in a direction away from the seal or bearing. The spiraling rib or ribs transport the magnetic particles clinging to the apices thereof away from the seal or bearing during relative rotation of the two parts of the mechanism. Where magnetizable radial surfaces are both provided with spiraling ribs in adjacent relation, the spiraling ribs on one surface are in crossed relationship to those on the other surface so as to thereby create a field of maximum magnetic intensity where the apices of the adjacent cooperating spiraling ribs cross each other.

Collection of magnetic particles at the apices of the inclined ribs may be further augmented and increased by filling the spaces or valleys between the rib turns with a suitable non-magnetic material, such as a resin varnish, which nevertheless leaves the apices of ribs exposed. In cases where the mechanism contains coupling material such as a magnetic fluid comprising magnetic particles mixed with an oil or solid lubricant, tests have shown that the more solid lubricant component will eventually pack into the valleys between the rib runs and thus provide a non-magnetic material which facilitates collection of the magnetic particles at the exposed apices of the ribs.

The accompanying drawings are intended to illustrate only some of the coupling mechanisms in which the principles of this invention may be advantageously employed to exclude magnetic particles from the seals and bearings thereof. By way of example, FIG. I of the drawings is intended to illustrate only one of the many forms of power transmission, power coupling, power clutching and power braking mechanisms with which the device of this invention may be associated. The function of the mechanism typified in FIG. I is to provide an adjustable coupling torque between its main parts A and B. The main part A comprises a driven shaft 1 fixed to a tubular casing section 2 which contains a core section 3 secured to the tubular casing section 2 as by bolts 4. The tubular casing section 2 and the core section 3 are made of magnetizable material such as soft iron and define a cylindrical passage 5 therebetween. A non-magnetic bearing housing 6, which may be made of a metal such as aluminum or other non-magnetic metal or plastic, is secured as by bolts 7 to the tubular casing section 2 and the joint rendered substantially leakproof by a sealing gasket 8 therebetween.

The companion part B of the mechanism comprises a coupling member 11, which in the instant mechanism is sometimes referred to as a drag cup, having a magnetizable cylindrical side wall 12 which extends into the cylindrical passage 5 of the main part A and a base wall 13 suitably secured as by a key 14 to a driven shaft 15 of the mechanism. The driven shaft 15 is rotatably supported within the bearing housing 6 by a pair of ball bearing assemblies 16 and 17, the outer bearing assembly 17 being held in fixed position as by a cover plate 18 secured as by screws 19 to the end of the bearing housing 6. The inner bearing assembly 16 preferably has a sealing ring 20 associated therewith to retain liquid and solid lubricants within the magnet assembly 50.

A suitable electromagnetic coil 9 is contained within the tubular casing section 2 in pocketed position between the core section 3 and the casing section 2, and is electrically connected as by lead wires 10' to a slip ring assembly 10 which may be mounted on the driving shaft 1. The intensity of the magnetic field produced by the coil 9 may be variably controlled as desired by suitable control of the current supply to the slip ring 10 as is well known in the art. The base end of the core section 3 and the adjacent face of the bearing housing 6 define a base passage 5' therebetween in which the base wall 13 of the drag cup 11 is contained. The base passage 5' joins the cylindrical passage 5 within which the side wall 12 of the drag cup 11 is contained.

The cylindrical passage 5 and base passage 5' contain a flowable magnetic material *c* which may comprise a mixture of lubricating oil and magnetic powder or particles, with or without a solid lubricant, or magnetic powder with a solid lubricant, or dry magnetic powder only. The flowable magnetic material *c* provides the coupling medium between the drag cup 11 of the driven part B and the core section 3 and surrounding cylindrical section 2 of the driver part A. The base wall 13 of the drag cup 11 may be provided with spaced holes 22 therein through which the magnetic material *c* may freely flow. When the electromagnet 9 is energized by the controlled current supply, magnetic flux will flow through the side wall 12 of the magnetizable drag cup 11 and through the magnetic particles in the adjacent gaps of passage 5 so that a coupling torque is thereby established between the main parts A and B. The flowable magnetic mixture *c* thereby acquires a degree of rigidity which is proportioned to the amount of magnetic flux which is in turn controlled by the current supply to the electromagnet 9. Dependent on the intensity of the magnetic flux established by the current supply, there will be a controllable amount of maximum torque which can be transmitted between the driving part A and the driven part B, as is well known in the case of magnetic clutches and brakes and other coupling mechanisms.

The device of this invention is designed to be positioned between the coupling members 2, 3 and 11 and the adjacent bearing assembly 16 or sealing gasket 20. The device as shown in FIGS. I, II and III comprises a toroidal magnet assembly 50 contained within a pocket 50' formed in the adjacent non-magnetic bearing housing 6, and may be retained in fixed position by a non-magnetic locking plate 23 secured as by screws 24 to the adjacent face of the bearing housing 6. The magnet assembly 50 may comprise either an electromagnet or a permanent magnet ring 51 set between a pair of pole rings 52 and 53, and between which a non-magnetic spacer ring 54 is also clamped. The toroidal magnet assembly thus presents a substantially cylindrical interior surface 55 formed by the aligned interior cylindrical surfaces of the magnetizable pole rings 52 and 53 and the non-magnetic spacer ring 54. The driven shaft 15 has a magnetizable exterior surface 56 in coaxial alignment with the interior cylindrical surface 55 of the toroidal magnet assembly 50, and the magnetizable surface 56 has a helical rib 57 formed thereon. The magnetizable surface 56 and its helical rib 57 may be integral with the driven shaft 15, or may be assembled in the form of a magnetizable sleeve which embraces the shaft 15, in which case the shaft 15 may be formed of either magnetizable or non-magnetizable material.

The helical thread 56 is so formed as to incline in a direction away from the bearing seal 20 and bearing assembly 16 so as to screw out or carry outwardly away from the bearing assembly 16 such magnetic particles as may migrate into the space or gap defined between the exterior magnetizable surface 56 of the shaft 15 and the interior magnetizable surface 55 of the toroidal magnet assembly 50. The grooves or valleys between the rib runs may be filled with a non-magnetic packing 58, such as a suitable resin varnish composition, and if not so filled, tests have shown that they will nevertheless become filled with the relatively solid lubricating component of the magnetic mixture which is also non-magnetic.

Since the distance between the apices of the rib 57 and the adjacent interior cylindrical surface 55 of the magnet assembly, is uniformly less than the distance between the interior cylindrical surface 55 of the magnet assembly 50 and any other point on the exterior magnetizable surface 56 of the adjacent shaft section, the magnetic field engendered by the magnet ring 51 through the pole rings 52 and 53 and the magnetizable surface 56 of the adjacent shaft section, will be of maximum intensity between the apex of the helical rib 57 and the interior surface 55 of the magnet assembly. As a result, migrating magnetic particles which enter the radial gap will become concentrated on the rib apex, making contact in a helical line with the inner surface of the pole rings 52 and 53. Frictional or rolling contact of the magnetic particles with the magnetizable inner surfaces of the pole rings 52 and 53, will move the particles away from the bearing assembly and into the base passage 5' during slippage or relative rotation between the main parts A and B. This phenomenon, discovered after extensive tests, will be produced irrespective of the forces of gravity or centrifugal force, or whether the driven shaft 15 extends vertically or horizontally, or at any angle therebetween.

Observations of the action of a flowable magnetic material in a radial gap having relatively smooth interior and exterior surfaces, such as is formed when the helical rib 57 is omitted, show that there is no appreciable ejection of the particles which migrate into the radial gap. However, when a helical rib is formed on either one or both of the magnetizable surfaces 55 and 56, relative rotation of the parts A and B will result in positive ejection of the magnetic particles which migrate into the radial gap defined by the surfaces 55 and 56, provided the helical rib or ribs are directed in conformity with the relative rotation of the parts A and B so as to produce an outward screwing action. It is obviously necessary to employ the proper combination of relative rotation of the parts A and B and the direction or hand of the helical rib or ribs to insure outward ejection of the magnetic particles.

Tests have also shown that when a non-magnetic lubricant component is included in the magnetic mixture, that some of the lubricating component will work its way into the radial gap between the magnetizable surfaces 55 and 56. This is not objectionable since the lubricant component assists in lubricating the seal and bearing assembly.

The coupling mechanism of FIG. I is also fragmentarily shown in FIG. IV, but to further illustrate the various forms in which the magnetic particle excluding device of this invention may be made, the device shown in FIG. IV incorporates a companion helical rib 59 on the interior cylindrical surface 55 of the toroidal magnet assembly 50. The helical rib 59 is of opposite hand from the rib 57 formed on the magnetizable surface 56 of the driven shaft 15.

When magnetic material flows into the gap between the helical ribs 57 and 59, the magnetic particles will tend to collect at the apices of both ribs, where the magnetic field is intensified. Since the helical rib 57 is right hand, and the helical rib 59 is left hand, they will intersect each other at spaced points. At these points the magnetic field intensity is greatest since the air gap is at a minimum at the intersection points. Relative rotation of the driving part A with respect to the driven part B, will cause the points of intersection to move towards the base passage 5′. Any magnetic particles on the ribs 57 and 59 are caught by the points of intersection as they move along the ribs, and are carried outwards to the base passage 5′.

Satisfactory results are also obtained when the rib 59 is employed and rib 57 omitted. The excluding action is similar to that above described, except that magnetic particles collect at the apex of thread 59, and are moved along the thread by contact with the magnetizable surface 56 of the shaft 15. It is not necessary that the ribs 57 and 59 be of the same pitch, or that only single ribs be employed. Any combination of ribs of opposite hand may be used. One rib may also be replaced by a series of axial ribs, which may be considered as multiple ribs of infinite lead.

Tests have also demonstrated that very satisfactory magnetic particle excluding results can be obtained where only the interior cylindrical surface 55 of the toroidal magnet assembly carries a helical rib 59, and with the adjacent magnetizable surface 56 of the adjacent shaft section relatively smooth and not ribbed. Where only a single helical rib 59 on the interior surface 55 of the driven part B is employed, it will be obviously understood that the direction of turn of the rib 59 should be such as to insure outward movement of the magnetic particles clinging to the apex thereof when relative rotation between the driving part A and driven part B is established. The valleys between the rib formations 57 and 59 may also be filled with a suitable non-magnetic packing material 58 to facilitate collection of magnetic particles at the exposed apices thereof.

To further illustrate the various types of coupling mechanisms and the various forms of magnetic particle excluding devices of this invention which may be assembled in operative combination, there is shown in FIG. V a disc-type coupling mechanism which may be made for use as a magnetic clutch or a magnetic brake. The mechanism shown in FIG. V comprises essentially a driving part A′ and a driven part B′. The driving part A′ may comprise a coupling member formed by a magnetizable disc-shaped coupling section 27 fixed to a driving shaft 26 and having a magnetizable ring-shaped coupling section 28 secured thereto as by bolts 29, and with the joint therebetween sealed by a sealing gasket 29′. The adjacent magnetizable faces of the sections 27 and 28 define a radial passage 30 therebetween which is sealed off by the sealing gasket 29′. A non-magnetic bearing housing 31, attached to the ring-shaped coupling section 28 as by bolts 32, supports a pair of inner and outer bearing assemblies 33 and 34, the inner bearing assembly 33 having a bearing seal 35 adjacent thereto.

The companion part B′ comprises a disc-shaped part having a magnetizable coupling section or member 36 which extends into the radial passage 30 and between the magnetizable sections 27 and 28, and also includes a hub section 36′ which may be made of non-magnetizable material and which is suitably fixed to a driven shaft 37 rotatably supported in the inner and outer bearing assemblies 33 and 34.

A ring-shaped electromagnetic coil 38 is pocketed between the disc-shaped coupling section 27 and the ring-shaped coupling section 28 and electrically connected as by lead wires 39′ to a slip ring assembly 39 rotatably supported on the driving shaft 26. The coupling sections 27 and 28 which form one of the coupling members, and the companion coupling member 36, are all made of magnetizable material such as soft iron. When the coil 38 is energized by controlled electric current, a magnetic circuit is established around the coil 38 through the coupling sections 27 and 28 and coupling member 36. The coupling member 36 is completely surrounded by a magnetic material *c* in the radial passage 30. When current is passed through the coil 38, magnetic flux will flow through the coupling member 36 and the magnetic particles in the passage 30 will partly solidify and thereby produce a coupling torque between the parts A′ and B′ which is proportional to the current flow to the coil 38.

A toroidal magnet assembly 60 is snugly seated and secured within a conforming pocket 60′ formed in the end face of the bearing housing as shown in FIGS. V and VII. The magnetic assembly 60 may be positioned immediately adjacent the bearing seal 35, is coaxial with the driven shaft 37, and presents a radial surface 61. The adjacent hub section 36′ of the disc-shaped coupling member 36 presents a magnetizable surface 62 which may comprise a ring-shaped magnetizable plate having a spiraling rib formation 63 which is coaxial with the adjacent radial surface 61 of the toroidal magnet assembly 60 and substantially co-extensive therewith as shown in FIGS. V, VI and VIII. The spiraling rib 63 may have any desired number of turns which spiral outwardly away from the driven shaft 37.

The exposed radial surface 61 of the toroidal magnet assembly 60 and the adjacent radial surface 62 fixed to the coupling member 36 define therebetween a base passage 30′ which communicates with the radial passage 30 as by a neck passage 30″. The passage 30 is filled with flowable magnetic material *c* which provides the coupling medium between the disc-shaped coupling member 36 and the surrounding coupling member as formed by the casing sections 27 and 28. The hub portion 36′ of the shaft 37, to which the magnetizable surface 62 is attached, may be made of non-magnetic material.

Magnetic particles migrating from the radial passage 30 into the base or gap passage 30′ are driven by the spiral rib formation 63, operating in cooperation with the radial surface 61 of the magnet assembly 60, from the base passage 30′ and away from the neck portion of the shaft 37 which is adjacent to the bearing seal 35. During relative rotation of the part A′ and B′, the lines of greatest magnetic intensity are concentrated at the apices of the spiraling rib 63 and are accordingly advanced along the spiraling rib 63 by the relatively slower rotative speed of the spiral rib 63 as compared with the relatively higher rotative speed of the magnetizable surface 61 of the magnet assembly 60 as resulting from the established slippage between the parts A and B.

Since the magnetic field in the gap between the rib 63 and the adjacent radial face 61 of the magnet 60, will be concentrated at the apex of the spiral rib 63, any magnetic particles in the gap will concentrate along the spiral rib 63. When relative rotation of the parts A' and B' is established, the magnetic particles will make rolling contact with radial surface 61 of the magnet 60 and be swept along by the spiral rib 63 in a direction outwardly from the neck of the shaft 37. Since the spiral rib 63 always rotates in the same direction relative to the radial surface 61 of the magnet 60, the spiral rib should be so formed as to require travel of the magnetic particles in a direction away from the neck of the shaft 37. When this form of magnetic particle excluding device is employed, no migrating magnetic particles can enter the bore of the toroidal magnet assembly 60 or reach the adjacent bearing seal 35.

There is shown in FIG. VIII a longitudinal section of another form of mechanism having a further modified form of the magnetic particle excluding device of this invention associated therewith. The mechanism shown in FIGS. VIII, IX and X comprises a rotating part A'' and a relatively stationary part B''. The rotating part A'' comprises essentially a driving shaft 40 having an integral shaft extension 40'. The relatively stationary part B'' comprises a non-magnetic bearing housing 41. A bearing assembly 42 is pocketed within a recess 42' formed in the housing part B''. A bearing seal 43, also pocketed in the recess 42', is designed to retain lubricants within the magnet assembly 64.

The magnetic particle exclusion device associated with the mechanism shown in FIG. VIII comprises a toroidal magnet assembly 64 fixed within a conforming recess 64' formed in the face of the bearing housing 41. The magnet assembly 64 comprises a ring-shaped magnet 65 having a magnetizable collar 66 attached thereto and presenting an interior cylindrical surface 67 which is spaced from the magnetizable exterior cylindrical surface 68 carried by an adjacent section of the shaft extension 40', so as to define a radial gap 80 therebetween.

The exterior magnetizable surface 68 may be formed as a sleeve applied to the adjacent shaft section, or may be an integral part of the shaft section. The radial face of the magnet ring 65 has a non-magnetic spacer ring 69 in abutting relation to the magnetizable collar 66, and a large diameter magnetizable ring 70 in abutting relation to the spacer ring 69. The disc member 71 is secured to the driving shaft 40 as by key 71' and presents a magnetizable surface 72 which is coaxial with the shaft 40 and of a diameter comparable to the diameter of the magnet assembly 64. The radial surface 72 is adjacent to the coextensive radial surface of the magnet assembly 64 and defines an axial gap 81 therebetween.

The exterior cylindrical surface 68 on the shaft extension 40' carries a helical rib 73 and the interior cylindrical surface 67 of the toroidal magnet assembly 64 may also be provided with a helical rib 74 of opposite hand. The magnetizable radial surface 72 of the disc member 71 may also carry a spiral rib 75 in adjacent relation to the coextensive radial facing of the collar 66, spacer ring 69 and outer ring 70. The outer face of the outer ring 70 may also have a spiral rib 76 which is cut the same hand as the adjacent spiral rib 75 on the magnetizable surface 72, and faces it so that the spirals are in opposing relationship and cross each other at regular intervals.

The magnet assembly 60 produces a closed magnetic circuit through the outer magnetizable ring 70, through the radial gap 81 and the radial surface 72 of the disc member 71, through the shaft 40, through the magnetizable surface 68 of the shaft 40, and through the adjacent radial gap 80 and magnetizable collar 66. The magnetic flux thus established in the axial gap 81 and radial gap 80 causes the magnetic particles within these gaps to collect on the apices of the adjacent ribs at points of crossing during relative rotation of the parts A'' and B''.

The device disclosed in FIG. VIII is designed to eject abrasive particles which may tend to migrate into the axial gap 81 between the outer periphery of the disc member 71 and the outer periphery of the outer ring 70. When magnetic particles migrate into the axial gap 81, or should any particles reach the radial gap 80, they will concentrate at the points of maximum field strength, or at the apices of the ribs. Since the magnetic field intensity is greatest at the points of rib intersection and where the air gap therebetween is a minimum, relative rotation of the parts A'' and B'' will eject the abrasive particles migrating into the gap therebetween.

As mounted, the adjacent spiral ribs 75 and 76 between which the abrasive particles may initially enter, are of the same hand, but since they face each other will intersect at equally spaced distances along the ribs. Should any stray magnetic particles move further into the axial gap 81, they would be ejected by the spiral thread 75 on the magnetizable surface 72. If by chance, any particles should attempt to enter the radial gap 80, they would be ejected therefrom by the cooperative action of the helical threads 73 and 74. The threads 75 and 76 may have the same pitch or a different pitch, and the helical ribs 73 and 74 may also have the same or a variable pitch. Any magnetic particles which may migrate into the axial gap 81 or reach the radial gap 80 are caught at the points of intersection of the ribs during relative rotation of the parts A'' and B'', where the magnetic field intensity is the greatest, and driven outwardly along the threads.

To further illustrate the various types of magnetic coupling mechanisms and the various forms of magnetic particle redirecting devices of this invention which may be assembled in operative combination, there is shown in FIG. XI a coupling mechanism which embraces two relatively rotatable parts A''' and B'''. The part A''' comprises a cup-shaped coupling member 120 having a cylindrical section 121 and a base section 122 which is fixed by a key 123 to a rotatable shaft 124. The shaft 124 is rotatably supported in a suitable bearing assembly 125 set within a bearing sleeve 128 of one section 127 of a stationary bearing housing 126. The other section 129 of the bearing housing 126 also has a bearing sleeve 130 which supports a bearing assembly 131 in which the shaft 132 of the other relatively rotatable part B''' of the mechanism is rotatably mounted. The two sections 127 and 129 of the stationary housing 126 may be connected by bolts 127' and a sealing gasket 128' therebetween.

The part B'' may include a cylindrical coupling member 133 which is contained within the cylindrical section 121 of the companion coupling member 120 and so fitted as to present a cylindrical coupling passage 134 therebetween which may communicate with a base passage 134' between the adjacent faces of the base section 122 of the coupling member 120 and the base end of the cylindrical coupling member 133. The coupling member 133 is secured to its shaft 132 as by key 132'.

One or more electromagnetic coils 135 positioned adjacent the coupling passage 134 may be set into the outer cylindrical surface of the coupling member 133, or into the interior cylindrical surface of the cylindrical section 121 of the adjacent coupling member 120, as desired. The shaft 132 may present an interior passage 136 through which the lead lines 137 to the coils 135 may be conducted. The lead lines 137 are connected to a slip ring assembly 138 mounted on the shaft 132 and supplied with current through an exteriorly controlled circuit 139. When exteriorly controlled current is supplied to the coils 135, a magnetic circuit is established between the cylindrical section 121 of the coupling member 120 and the companion cylindrical coupling member 133 which produces a magnetic field in the coupling passage 134. The intensity of the magnetic field in the coupling passage 134 is dependent upon the concentration of magnetic particles in the passage 134 as well as the controlled current supply to the electromagnets 135.

The magnetic coupling mechanism shown in FIG. XI incorporates a further form of magnetic particle redirecting device 156 which operates to redirect and return magnetic particles migrating from the coupling passage 134. The redirecting device 156 includes a magnet assembly 157 set within a cylindrical pocket 141 of the end wall 140 of the stationary housing section 129. The magnet assembly 157 comprises a yoke ring 158, and permanent magnet rings 159 and 160 may be provided with magnetizable terminal pads 159' and 160' which may be made of soft iron and readily machinable. The terminal end of the non-magnetic ring 161 is positioned directly opposite the open end of the cylindrical coupling gap 134 and with the terminal pads 159' and 160' adjacent to and on opposite sides thereof.

As shown in FIGS. XI and XII, the terminal pad 159' has a magnetizable surface 163 which presents a spiraling rib 165 which spirals towards the open end of the coupling gap 134, and the terminal pad 160' also has a magnetizable surface 164 which presents a spiral rib 166 which is of opposite hand from the spiral rib 165 and also spirals in a direction towards the open end of the coupling gap 134. The coupling member 133 presents a raised heel portion 133' which presents a magnetizable surface 167 directly adjacent to the magnetizable surface 163 of the terminal pad 159' and thus defining an axial gap 171 therebetween. As shown in FIGS. XI and XIII, the magnetizable surface 167 of the heel portion 133' also has a spiraling rib 169 which spirals towards the open end of the cylindrical coupling gap 134 and is of same hand as the spiral rib 165 with which it cooperates. The free end of the cylindrical section 121 of the coupling member 120 also presents a magnetizable surface 168 which has a spiral rib 170 which spirals towards the open end of the cylindrical coupling gap 134 and is of same hand as the spiral rib 166 formed on the magnetizable surface 164 of the terminal pad 160'; the adjacent magnetizable surfaces 164 and 168 defining an axial gap 172 therebetween.

Magnetic particles which migrate from the open end of the cylindrical coupling gap 134 and into the inner axial gap 171 are returned to the open end of the coupling passage 134 by the action of the spiral ribs 165 and 169 which face the inner axial gap 171. Likewise, magnetic particles which migrate from the open end of the coupling passage 134 to the outer axial gap 172 are returned to the open end of the coupling passage 134 by the cooperative action of the adjacent spiraling ribs 166 and 170 which face the outer axial gap 172. Return of the magnetic particles from the inner and outer axial gaps 171 and 172 to the open end of the coupling passage 134 is effected during rotation of the coupling members 133 and 120, both of which rotate relative to the end wall 140 of the stationary bearing housing 126 which supports the magnet assembly 157.

The magnetic particles which migrate into the inner and outer axial gaps 171 and 172 will affix themselves to the apices of the adjacent spiral ribs 165—169 and 166—170, where the magnetic field engendered by the magnet assembly 156 is of maximum intensity, and the affixed particles will thereupon be returned to the open end of the coupling passage 134 during relative rotation of the coupling members 133 and 120 with respect to the end wall 140 of the bearing housing 126 which supports the magnet assembly 157. Effective return action of the migrating magnetic particles can also be obtained when the radial magnetizable surfaces 163—164 of the magnet assembly 156 are relatively smooth, in which case the adjacent spiraling ribs 169—170 will operate to return the migrating magnetic particles to the open end of the coupling passage 134. Effective return action is also obtained, when the radial magnetizable surfaces 167—168 are relatively smooth, by the action of the adjacent spiral ribs 165—166. The grooves or valleys between the rib runs 165—169 and 166—170 may be filled with a non-magnetic packing, such as a suitable resin varnish composition, and if not so filled, tests have shown that the grooves will nevertheless become filled with the relatively solid lubricating component of the magnetic mixture employed as the coupling medium.

To assist in driving the magnetic particles returned to the open end of the coupling gap passage 134 inwardly into the coupling passage for the desired distance, that section of the cylindrical surface of the magnetizable coupling member 133 which is adjacent to the raised heel portion 133' thereof, may be provided with a helical rib 173 which inclines inwardly towards the opposite end of the coupling passage 134. The magnetic particles will concentrate at the apices of the spiral rib 173 which face the terminal end of the coupling passage 134, and will be driven inwardly of the coupling passage 134 during relative rotation of the coupling members 133 and 120. Thus the helical rib 173 serves also to assist in maintaining the magnetic particles in the vicinity of the magnetic field engendered by the coils 135.

A further modified form of the magnetic particle redirecting device of this invention is shown in FIG. XV in association with the magnetic coupling mechanism of FIG. XI. The redirecting device 175 shown in FIG. XV comprises a magnet assembly 176 which is affixed to the cylindrical member 133 adjacent the open end of the coupling passage 134. The magnet assembly 176 comprises an axially magnetized permanent magnet ring 177 which is magnetically isolated from the shaft 132 by a non-magnetic spacer ring 178. The magnet assembly 176 presents an exterior pole ring 179 of magnetic material, such as soft iron, which is isolated from the coupling member 133 by a non-magnetic spacer ring 180. A magnetic circuit is thus established by the magnet ring 177 through the pole ring 179 and its magnetizable surface 181; through the adjacent magnetizable surface 182 of the adjacent portion of the cylindrical section 121 of the cylindrical coupling member 120 and through the adjacent magnetizable surface 181' of the coupling member 133.

The magnetizable surface 182 of the cylindrical section 121 of the coupling member 120 presents a helical rib 184 which is inclined in a direction inwardly of the coupling passage 134; and the adjacent magnetizable surface 181 of the pole ring 179 may also be provided with a helical rib 183 which extends in a direction inwardly of the coupling passage 134 and is of opposite hand from the adjacent helical rib 184. In addition, the adjacent magnetizable surface 181' of the coupling member 133 may also present a helical rib 183' which extends in a direction inwardly of the coupling passage 134 and is of the same hand as the helical rib 183 but of opposite hand from the adjacent helical rib 184.

The adjacent magnetizable surfaces 181—181' and 182 presents a terminal gap extension 134'' of the main coupling passage 134. Magnetic particles which migrate from the main coupling passage 134 into the gap extension 134'' are driven inwardly and return to the main coupling passage 134 by the action of the spiral ribs 183—183' on one side of the gap extension and the spiral rib 184 on the other side of the gap extension during relative rotation of the coupling members 120 and 133. The magnetic particles which migrate into the gap extension 134'' will affix themselves to the apices of the adjacent helical ribs 183—183' and 184, where the magnetic field engendered by the magnet assembly 176 is of maximum intensity, and the affixed particles are thereupon returned to the main coupling passage 134 during relative rotation of the coupling members 133 and 120. Effective return action of the migrating magnetic particles can also be obtained when the axially extending magnetizable surfaces 181—181' are relatively smooth, in which case the adjacent spiraling rib 184 will operate to return the magnetic particles to the main coupling passage 134.

It will be noted that in all forms of magnetic particle excluding devices constructed in accordance with this invention, the magnetic particles are completely excluded from the bearing assembly and bearing seal, with the result that there is no abrasive wear on either the bearing seal or bearing assembly. Magnetic braking effects due to eddy currents or magnetic hysteresis, are also absent since there is no change in flux density directly adjacent the seal or bearing area. Many shapes and arrangements of magnetic particle excluding devices can be made by following the teachings of this invention. Permanent magnets, or A.C. or D.C. electromagnets may be employed. The inclined abrasive particle excluding ribs may be formed on the exposed surface of the magnet assembly, or on adjacent surfaces within the magnetic field. The valleys between the rib runs may in all cases be filled with a non-magnetic material to facilitate collection of the magnetic particles at the apices of the ribs. In the event a dry magnetic mixture is used, oil seals for the bearing assembly may be replaced by any other suitable form of bearing retainer.

While certain novel features of this invention have been disclosed herein and are pointed out in the claims, it will be understood that various omissions, substitutions and changes may be made by those skilled in the art without departing from the teachings of this invention.

This application is a continuation in part of my copending applications Serial Nos. 558,130 and 558,132 filed January 9, 1956, now abandoned.

What is claimed is:

1. A device for excluding magnetic particles from the seal or bearing between two relatively rotatable members which includes, a pair of substantially radial surfaces of magnetizable material coaxially arranged in spaced relation to each other and designed to be respectively fixed to said members in spaced relation to the seal or bearing, one of said radial surfaces being presented by a surface of a permanent magnet assembly comprising a permanent magnet and associated pole portions substantially isolated by non-magnetic material from the member to which it is fixed, at least one of said surfaces having a spirally extending rib adjacently spaced with respect to the other radial surface and designed to spiral away from the seal or bearing, the apex of said rib defining with the adjacent radial surface a substantially axial gap of reduced axial length therebetween, said permanent magnet assembly providing a source of magnetomotive force for maintaining a concentrated magnetic field in said gap during relative rotation of said surfaces whereby magnetic particles entering said reduced axial length gap are carried away from the seal or bearing along the apex of said rib.

2. A device for excluding magnetic particles from the seal or bearing between two relatively rotatable members which includes, a pair of substantially radial surfaces of magnetizable material coaxially arranged in spaced relation to each other and designed to be respectively fixed to said members in spaced relation to the seal or bearing, one of said radial surfaces being presented by a surface of a permanent magnet assembly comprising a permanent magnet and associated pole portions substantially isolated by non-magnetic material from the member to which it is fixed, said radial surfaces together presenting a pair of cooperating spiral ribs in adjacently spaced relation and designed to spiral outwardly away from the seal or bearing, the apices of said ribs together defining a substantially axial gap of reduced axial length therebetween, said permanent magnet assembly providing a source of magnetomotive force for maintaining a concentrated magnetic field in said gap during relative rotation of said surfaces whereby magnetic particles entering said gap are carried away from the seal or bearing by the combined action of the apices of said spiral ribs.

3. In combination with a magnetic coupling mechanism having relatively rotatable coupling members of magnetizable material defining passages therebetween containing flowable magnetic particles, externally controllable electromagnetic means for establishing a magnetic field between said coupling members to thereby magnetize the magnetic particles in said magnetic field and thus provide a coupling connection between said members, and a bearing assembly between said relatively rotatable coupling members, of a device for excluding magnetic particles from said bearing assembly and returning same to said passages which includes, a pair of substantially radial surfaces of magnetizable material coaxially arranged in spaced relation to each other and respectively mounted for relative rotation with said coupling members and positioned between said passages and said bearing assembly, one of said radial surfaces being presented by a surface of a permanent magnet assembly comprising a permanent magnet and associated pole portions substantially isolated by non-magnetic material from the coupling member with which it is associated, at least one of said surfaces having a spirally extending rib adjacently spaced with respect to the other radial surface and spiraling away from said bearing assembly and toward said passages, the apex of said rib defining with the adjacent radial surface a substantially axial gap of reduced axial length therebetween, said permanent magnet assembly providing a source of magnetomotive force for maintaining an independent and concentrated magnetic field in said gap during relative rotation of said coupling members whereby magnetic particles entering between said surfaces are carried away from said bearing assembly along the apex of said rib formation and returned to said passages.

4. In combination with a magnetic coupling mechanism having relatively rotatable coupling members of magnetizable material defining passages therebetween containing flowable magnetic particles, externally controllable electromagnetic means for establishing a magnetic field between said coupling members to thereby magnetize the magnetic particles in said magnetic field and thus provide a coupling connection between said members, and a bearing assembly between said relatively rotatable coupling members, of a device for excluding magnetic particles from said bearing assembly and returning same to said passages which includes, a pair of substantially radial surfaces of magnetizable material coaxially arranged in spaced relation to each other and respectively mounted for relative rotation with said coupling members and positioned between said passages and said bearing assembly, one of said radial surfaces being presented by a surface of a permanent magnet assembly comprising a permanent magnet and associated pole portions substantially isolated by non-magnetic material from the coupling member to which it is fixed, said radial surfaces presenting a pair of cooperating spiral ribs in adjacently spaced relation and spiralling away from said bearing assembly and toward said passages, the apices of said ribs together defining a substantially axial gap of reduced axial length therebetween, said permanent magnet assembly providing a source of magnetomotive force for maintaining an independent and concentrated magnetic field in said gap during relative rotation of said coupling members whereby magnetic particles entering said gap are carried away from said bearing assembly and returned to said passages by the combined action of the apices of said spiral ribs.

5. A magnetic coupling mechanism having two relatively rotatable parts, one of said parts including a shaft fixed to a first coupling member, said other part enclosing said first coupling member and including a bearing housing for said shaft and a second coupling member in adjacently spaced relation to said first coupling member, a bearing assembly within said bearing housing and rotatably supporting said shaft, said first and second coupling members being formed of magnetizable material and defining passages therebetween for containing flowable magnetic particles, externally controllable electromagnetic means for establishing a magnetic field between said coupling members to thereby magnetize the magnetic particles in said magnetic field and thus provide a coupling connection between said coupling members, and a device for excluding magnetic particles from said bearing assembly and moving same towards said passages which includes, a toroidal magnet assembly comprising a permanent magnet and associated pole portions mounted in fixed relation to one of such coupling members but substantially isolated by non-magnetic material therefrom, said toroidal magnet assembly presenting a radial surface in adjacent relation to a companion radial surface formed of magnetizable material which is mounted in fixed relation to the other coupling member, said pair of radial surfaces being coaxially arranged in spaced relation to each other and positioned between said bearing assembly and said passages, at least one of said surfaces having a spiral rib adjacently spaced with respect to said other radial surface and spiralling away from said bearing assembly and toward said passages, the apex of said spiral rib defining with the adjacent radial surface a substantially axial gap of reduced axial length therebetween, said toroidal magnet assembly providing a source of magnetomotive force for maintaining an independent and concentrated magnetic field in said reduced length gap during relative rotation of said coupling members whereby magnetic particles entering said gap are blocked and moved away from said bearing assembly and toward said passages along the apex of said spiraling rib.

6. In combination with a magnetic coupling mechanism having relatively rotatable coupling members of magnetizable material defining a clutch gap passage therebetween for containing flowable magnetic particles, externally controllable electromagnetic means for establishing a magnetic field between said coupling members to thereby magnetize the magnetic particles in said clutch gap passage and thus provide a coupling connection between said members, of a device for returning stray magnetic particles to said clutch gap passage which includes, a pair of adjacent radial surfaces of magnetizable material coaxially arranged adjacent a terminus of said clutch gap passage and wherein at least one of said surfaces is mounted for rotation with one of said coupling members and for relative rotation with respect to the companion radial surface, one of said radial surfaces being presented by a surface of a permanent magnet unit, at least one of said radial surfaces presenting an elongated rib adjacently spaced with respect to the other surface and inclined in a direction toward said clutch gap passage, the apex of said elongated rib defining with the adjacent surface a contracted gap therebetween, said permanent magnet unit providing a source of magnetomotive force for maintaining an independent and concentrated magnetic field in said contracted clearance gap and whereby magnetic particles entering between said radial surfaces are maintained in said contracted clearance gap during non-rotation of said coupling members and returned to said clutch gap passage during relative rotation of said coupling members.

7. In combination with a magnetic coupling mechanism having relatively rotatable coupling members of magnetizable material defining a clutch gap passage therebetween for containing flowable magnetic particles, externally controllable electromagnetic means for establishing a magnetic field between said coupling members to thereby magnetize the magnetic particles in said clutch gap passage and thus provide a coupling connection between said members, of a device for returning stray magnetic particles to said clutch gap passage which includes, a pair of radial surfaces of magnetizable material coaxially arranged to provide a clearance gap adjacent a terminus of said clutch gap passage and wherein at least one of said radial surfaces is mounted for rotation with one of said coupling members and for relative rotation with respect to the companion radial surface, one of said radial surfaces being presented by a surface of a permanent magnet unit whose remaining surface areas are at least partially isolated by non-magnetic material from the member on which it is mounted, at least one of said radial surfaces presenting an elongated rib adjacently spaced with respect to the other radial surface and extending in a non-radial and non-circular direction with respect to the radial surface with which it is associated and inclined in a direction toward said clutch gap passage, the apex of said elongated rib defining with the adjacent radial surface a contracted clearance gap therebetween, said permanent magnet unit providing a source of magnetomotive force for maintaining an independent and concentrated magnetic field in said contracted clearance gap and whereby magnetic particles entering between said radial surface are maintained in said contracted clearance gap during non-rotation of said coupling members and are returned to said clutch gap passage during relative rotation of said coupling members.

8. In combination with a magnetic coupling mechanism having relatively rotatable coupling members of magnetizable material defining a clutch gap passage therebetween for containing flowable magnetic particles, externally controllable electromagnetic means for establishing a magnetic field between said coupling members to thereby magnetize the magnetic particles in said clutch gap passage and thus provide a coupling connection between said members, of a device for returning stray magnetic particles to said clutch gap passage which includes, a pair of radial surfaces of magnetizable material coaxially arranged to provide a clearance gap adjacent a terminus of said clutch gap passage and wherein at least one of said radial surfaces is mounted for rotation with one of said coupling members and for relative rotation with respect to the companion radial surface, one of said radial surfaces being presented by a surface of a permanent magnet unit, at least one of said radial surfaces presenting a spiral rib adjacently spaced with respect to the companion radial surface and spiralling in a direction toward said clutch gap passage, the apex of said spiral rib defining with the adjacent radial surface a contracted clearance gap therebetween, said permanent magnet unit providing a source of magnetomotive force for maintaining an independent and concentrated magnetic field in said contracted clearance gap and whereby magnetic particles entering between said radial surfaces are maintained in said contracted clearance gap during non-rotation of said coupling members and are returned to said clutch gap passage during relative rotation of said coupling members.

9. In combination with a magnetic coupling mechanism having relatively rotatable coupling members of magnetizable material defining a clutch gap passage therebetween for containing flowable magnetic particles, externally controllable electromagnetic means for establishing a magnetic field between said coupling members to thereby magnetize the magnetic particles in said clutch gap passage and thus provide a coupling connection between said members, of a device positioned adjacent a terminus of said clutch gap for returning stray magnetic particles to said clutch gap passage which includes, a pair of radial surfaces of magnetizable material coaxially arranged to provide a clearance gap adjacent a terminus of said clutch gap passage and mounted for relative rotation with said coupling members, one of said radial surfaces being presented by a surface of a permanent magnet unit, at least one of said radial surfaces presenting a spiral rib adjacently spaced with respect to the other radial surface and inclined in a direction toward said clutch gap passage, the apex of said elongated rib defining with the adjacent radial surface a contracted clearance gap therebetween, said permanent magnet unit providing a source of magnetomotive force for maintaining an independent and concentrated magnetic field in said contracted clearance gap whereby magnetic particles entering between said radial surfaces are maintained in said contracted clearance gap during non-rotation of said coupling members and are returned to said clutch gap passage during relative rotation of said coupling members.

10. A magnetic coupling mechanism which includes a rotatably mounted disc-shaped coupling member formed of magnetizable material, a companion rotatably mounted coupling member formed of magnetizable material extending over the opposite faces and around the peripheral edge of said disc-shaped coupling member and defining a clutch gap passage between the adjacent faces thereof for containing flowable magnetic particles, and a device positioned adjacent the terminus of said clutch gap passage operative to return stray magnetic particles to said clutch gap passage and maintain the magnetic particles in said clutch gap passage, said device including a pair of radial surfaces of magnetizable material coaxially arranged adjacent the terminus of said clutch gap passage and wherein at least one of said radial surfaces is mounted for rotation with one of said coupling members and for relative rotation with respect to the companion radial surface, one of said radial surfaces being presented by a surface of a permanent magnet unit whose remaining surfaces are at least partially isolated by non-magnetic material from the member on which it is mounted, at least one of said radial surfaces presenting a spiral rib adjacently spaced with respect to the other radial surface and spiralling in a direction toward said clutch gap passage, the apex of said spiralling rib defining with the adjacent radial surface a contracted clearance gap therebetween, said permanent magnet unit providing a source of magnetomotive force for maintaining an independent and concentrated magnetic field in said contracted clearance gap and whereby magnetic particles entering between said radial surfaces are maintained in said contracted clearance gap during non-rotation of said coupling members and are returned to said clutch gap passage during relative rotation of said coupling members.

11. A magnetic coupling mechanism which includes a rotatably mounted coupling member having a cylindrical wall formed of magnetizable material, a companion rotatably mounted coupling member formed of magnetizable material and having a cylindrical wall positioned adjacent the cylindrical wall of said first named coupling member and defining a cylindrical clutch gap passage between the adjacent faces of said cylindrical walls for containing flowable magnetic particles, and a device positioned at the terminus of said cylindrical clutch gap passage and operative to return stray magnetic particles to said clutch gap passage and maintain the particles in said clutch gap passage, said device including a pair of radial surfaces of magnetizable material coaxially arranged to provide a clearance gap adjacent the terminus of said cylindrical clutch gap passage and wherein at least one of said radial surfaces is mounted for rotation with one of said coupling members, one of said radial surfaces being presented by a surface of a permanent magnet unit whose remaining surfaces are at least partially isolated by non-magnetic material from the member on which it is mounted, at least one of said radial surfaces presenting a spiral rib adjacently spaced with respect to the other radial surface and spiralling in a direction toward said clutch gap passage, the apex of said spiralling rib defining with the adjacent radial surface a contracted clearance gap therebetween, said permanent magnet unit providing a source of magnetomotive force for maintaining an independent and concentrated magnetic field in said contracted clearance gap and whereby magnetic particles entering between said radial surfaces are maintained in said contracted clearance gap during non-rotation of said coupling members and are returned to said clutch gap passage during relative rotation of said coupling members.

12. A magnetic coupling mechanism which includes a rotatably mounted coupling member having a cylindrical wall formed of magnetizable material, a companion rotatably mounted coupling member formed of magnetizable material and having a cylindrical wall positioned adjacent the cylindrical wall of said first named coupling member and defining a cylindrical clutch gap passage between the adjacent faces of said cylindrical walls for containing flowable magnetic particles, a stationary casing enclosing said coupling members, and a device positioned adjacent the terminus of said cylindrical clutch gap passage and operative to return stray magnetic particles to said clutch gap passage and maintain the particles in said clutch gap passage, said device including a pair of radial surfaces presented by said clutch members and arranged on opposite sides of the terminus of said cylindrical clutch gap passage, a third radial surface presented by said casing and overlapping both radial surfaces of said clutch members and defining a pair of clearance gaps therebetween extending radially in opposite directions from the terminus of said cylindrical clutch gap passage, the radial surface associated with said stationary casing being formed by a surface of a permanent magnet unit whose remaining surfaces are at least partially isolated by non-magnetic material from the stationary casing on which it is mounted, the said pair of radially extending clearance gaps presenting a pair of spiralling ribs of opposite hand which spiral towards said cylindrical gap passage and form contracted clearance gaps, said permanent magnet unit providing a source of magnetomotive force for maintaining an independent and concentrated magnetic field in said contracted clearance gaps and whereby magnetic particles entering into said contracted clearance gaps are maintained therein during non-rotation of said coupling members and are returned to said clutch gap passage during relative rotation of said coupling members.

13. A magnetic coupling mechanism which includes a rotatably mounted coupling member having a cylindrical wall formed of magnetizable material, a companion rotatably mounted coupling member formed of magnetizable material and having a cylindrical wall positioned adjacent the cylindrical wall of said first named coupling member and defining a cylindrical clutch gap passage between the adjacent faces of said cylindrical wall for containing flowable magnetic particles, and a device positioned at the terminus of said cylindrical clutch gap passage and operative to return stray magnetic particles to said clutch gap passage and maintain the particles in said clutch gap passage, said device including a pair of cylindrical surfaces of magnetizable material coaxially arranged at the terminus of said clutch gap passage and wherein at least one of said cylindrical surfaces is mounted for rotation with one of said coupling members and for relative rotation with respect to the companion cylindrical surface, one of said cylindrical surfaces being presented by a surface of a permanent magnet unit whose remaining surfaces are at least partially isolated by non-magnetic material from the member on which it is mounted, at least one of said cylindrical surfaces presenting a helical rib adjacently spaced with respect to the other cylindrical surface and spiralling in a direction toward said clutch gap passage, the apex of said spiralling rib defining with the adjacent cylindrical surface a contracted gap therebetween, said permanent magnet unit providing a source of magnetomotive force for maintaining an independent and concentrated magnetic field in said contracted gap and whereby magnetic particles entering between said cylindrical surfaces are maintained in said contracted gap during non-rotation of said coupling members and are returned to said clutch gap passage during relative rotation of said coupling members.

14. A magnetic coupling mechanism which includes a rotatably mounted coupling member having a cylindrical wall formed of magnetizable material, a companion rotatably mounted coupling member formed of magnetizable material and having a cylindrical wall positioned adjacent the cylindrical wall of said first named coupling member and defining a cylindrical clutch gap passage between the adjacent faces of said cylindrical walls for containing flowable magnetic particles, and a device positioned adjacent the terminus of said cylindrical clutch gap passage and operative to return stray magnetic particles to said clutch gap passage and maintain the particles in said clutch gap passage, said device including; a cylindrical clearance gap at the terminus of said cylindrical clutch gap passage which is defined between cylindrical terminal wall portions of said cylindrical walls, one of said cylindrical terminal wall portions presenting a helical rib spiraling into the clutch gap passage and whose apex defines with the adjacent cylindrical terminal portion a contracted cylindrical gap therebetween; a pair of radial surfaces of magnetizable material extending radially from said contracted cylindrical gap and defining a radial clearance gap therebetween, at least one of said radial surfaces being mounted for rotation with one of said coupling members, at least one of said radial surfaces being presented by a surface of a permanent magnet unit whose remaining surfaces are at least partially isolated by non-magnetic material from the member on which it is mounted, at least one of said radial surfaces presenting a spiral rib adjacently spaced with respect to the other radial surface and spiralling in the direction toward said contracted cylindrical gap and whose apex defines with the adjacent radial surface a contracted radial clearance gap therebetween; said permanent magnet unit providing a source of magnetomotive force for maintaining an independent and concentrated magnetic field in said contracted cylindrical and radial clearance gaps and whereby magnetic particles entering said contracted clearance gaps are maintained therein during non-rotation of said coupling members and are returned to said clutch gap passage during relative rotation of said coupling members.

References Cited in the file of this patent

UNITED STATES PATENTS

| | | |
|---|---|---|
| 2,713,927 | Rabinow | July 26, 1955 |
| 2,809,733 | Perry | Oct. 15, 1957 |
| 2,863,538 | Jaeschke | Dec. 9, 1958 |

FOREIGN PATENTS

| | | |
|---|---|---|
| 976,917 | France | Nov. 1, 1950 |
| 680,233 | Great Britain | Oct 1, 1952 |

OTHER REFERENCES

Report, 1213, N.B.S., Washington, D.C. Copy Received in Division 68, U.S.P.O. March 30, 1948 (24 pages, Figure 17, page 24 of interest).